United States Patent [19]

Langs

[11] 4,336,905
[45] Jun. 29, 1982

[54] HEAT RECOVERY SYSTEM
[76] Inventor: James C. Langs, 3585 Dorothy La., Waterford, Mich. 48095
[21] Appl. No.: 169,788
[22] Filed: Jul. 17, 1980
[51] Int. Cl.³ .............................................. F24D 3/00
[52] U.S. Cl. ...................................... 237/8 R; 237/51
[58] Field of Search ................ 237/8 R, 51; 126/132, 126/133

[56] References Cited
U.S. PATENT DOCUMENTS

| 4,139,152 | 2/1979 | Kronberger, Jr. | 126/132 |
| 4,143,816 | 3/1979 | Shadeland | 126/132 |
| 4,180,053 | 12/1979 | Patel | 126/132 |
| 4,232,657 | 11/1980 | Killorin | 237/8R |
| 4,258,878 | 3/1981 | Van Pachtenbeke | 237/8 R |

Primary Examiner—Ronald C. Capossela
Attorney, Agent, or Firm—Gifford, VanOphem, Sheridan & Sprinkle

[57] ABSTRACT

An energy efficient heating system is provided for use with a fireplace or like means having a flue which recovers heat which is otherwise exhausted through the flue. The heating system comprises a heat collector in the form of a fluid conduit which is mounted within the flue and a housing positioned outside the fireplace. A holding tank having an open top is contained within the housing while the outlet from the fluid conduit is open to the tank. A drain on the tank forms a fluid outlet which is connected to the inlet of a heat exchanger while the heat exchange outlet is connected via a fluid pump to the inlet of the fluid conductor. Thus, upon activation of the fluid pump, a fluid, preferably water, is continually pumped through the fluid conduit while the exhaust gases passing through the flue heat the fluid. In addition, a fan is provided within the housing which circulates air through the heat exchanger and into the area which is to be heated.

8 Claims, 2 Drawing Figures

HEAT RECOVERY SYSTEM

BACKGROUND OF THE INVENTION

I. Field of the Invention

The present invention relates generally to heating systems and, more particularly, to such a system which utilizes the heat energy normally exhausted through a flue of a fireplace or like means.

II. Description of the Prior Art

In view of the ever increasing cost of petroleum products and natural gas and the continued depletion of the world's petroleum gas supplies, the development and use of alternate energy sources has become a national priority. In particular, it will be necessary to develop alternate energy sources for home and building (hereafter collectively referred to as home) heating systems since currently the vast majority of the homes in the United States are heated either by fuel oil or natural gas.

Wood forms an ancient and yet still abundant energy source for home heating. Wood, moreover, is particularly advantageous in that it is a renewable energy source unlike petroleum and natural gas which, when depleted, cannot be reproduced.

In its simplest form, wood can be used to heat a home by simply burning the wood in a fireplace and so that the heat of combustion of the wood heats the home. The simple combustion of wood in a fireplace, however, is an inefficient heating system for the home since the vast majority of the heat energy from the combustion of the wood is exhausted through the chimney or other flue system. Moreover, in practice, only the area of the home immediately surrounding the fire place becomes comfortably heated while rooms of the home away from the fireplace remain relatively cold. For these reasons, the use of wood as a heat source for home heating has been used only with limited success.

SUMMARY OF THE PRESENT INVENTION

The present invention overcomes the above mentioned disadvantages by providing an energy efficient system for home heating utilizing wood as the energy source.

In brief, the heating system of the present invention is intended for use with a fireplace having a chimney or other flue through which the combustion products from burning wood in the fireplace are exhausted. The heating system itself comprises a heat collector in the form of a coiled fluid conduit which is mounted within the fireplace flue and thus indirect contact with the combustion products from the combustion of wood in the fireplace. The fluid conduit has two open ends, one of which forms an inlet while the other end outlet, and these ends of the fluid are positioned exteriorly of the fireplace flue.

The heating system of the present invention further comprises a housing positioned exteriorly of the fireplace and a holding tank having an open top is contained within the housing. The outlet from the fluid conduit is secured to the housing and is open to the tank so that fluid flow through the fluid conduit flows into the tank. A heat exchanger is also contained within the housing and has an inlet which is connected to a drain on the tank so that fluid flows from the tank and into the inlet of the heat exchanger. Similarly, the heat exchanger includes an outlet which is connected to the inlet of a fluid pump while the outlet from the fluid pump is connected to the inlet end of the fluid conduit. Thus, upon activation of the pump, the pump pumps fluid through the heat collector and likewise through the tank and heat exchanger means in the housing. A fan is also contained within the housing and, upon activation, forces air from the room surrounding the housing, through the heat exchanger and back into the room.

In operation, the combustion of wood within the fireplace heats the fluid, preferably water, contained within the heat collector and this heated water is then returned to the holding tank in the housing. The pump then pumps this heated water through the heat exchanger while, simultaneously, the fan blows air through the heat exchanger so that the heat from the water is transferred and this air thus heating the room surrounding the housing. The water, now relatively cool, is then returned by the pump to the heat collector for reheating and the cycle is then repeated.

In a preferred form of the invention, the operation of the pump is controlled by a first heat sensor positioned within the chimney flue and a second heat sensor positioned within the holding tank. The first heat sensor senses the temperature of the flue and, when the temperature is below a predetermined amount indicative that combustion in the fireplace is not in process, the control of the pump passes to the second sensor. When the holding tank temperature falls below a predetermined value, the second heat sensor deactivates the pump thereby conserving energy.

A still further advantage of the heating system of the present invention is that the holding tank is open at its top and, in turn, is open through a screen in the housing to the room which is to be heated. Thus, the heating system of the present invention provides moist heat to the room since a certain amount of steam escapes from the tank and to the room thus eliminating the need for additional humidification.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
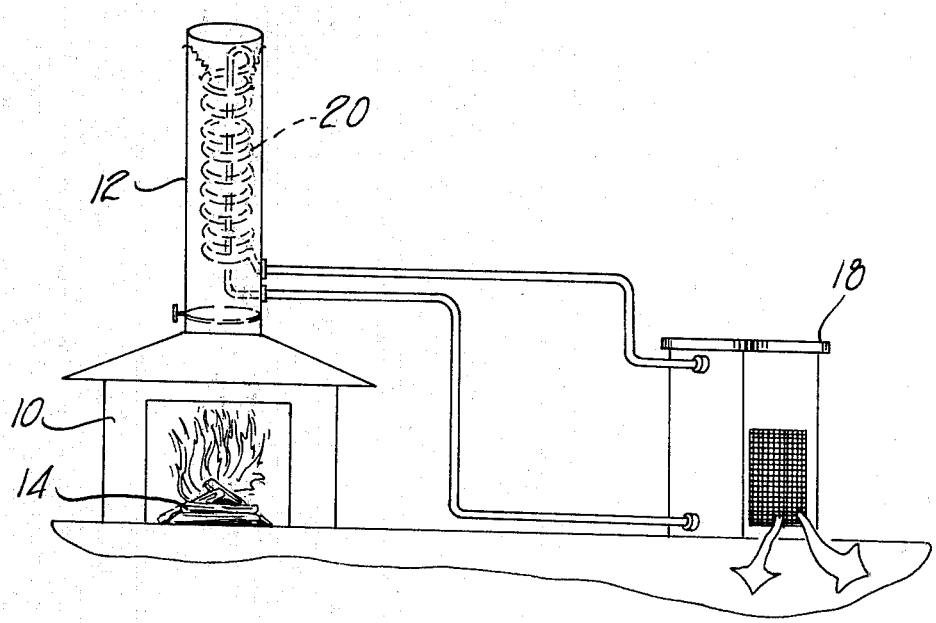
FIG. 1 is a front view illustrating the heating system according to the present invention.

With reference then to the drawing, a preferred embodiment of the heating system of the present invention is thereshown for use with a fireplace 10 having a flue 12 through which the combustion products from combustion in the fireplace 10 exhaust. It will be understood, moreover, that the term "fireplace" as used herein shall mean any place where a combustible product, such as wood 14, is burned, and therefore is not specifically limited to the type of fireplace often times found in homes.

The heating system further comprises a heat collector 16 which is positioned within the interior of the flue 12 and a housing 18 which is positioned exteriorly of the fire place 10 and which will be subsequently described in greater detail. The heat collector 16 is in the form a fluid conduit 20 having an outlet end 22 and an inlet end 24, both of which extend to the housing 18. Preferably, the fluid conduit 20 is coiled in a helix and extends for a substantial length along the interior of the flue 12. Any suitable means, such as chains 26 can be used to hold the fluid conduit 20 within the interior of the flue 12.

Figure 2:
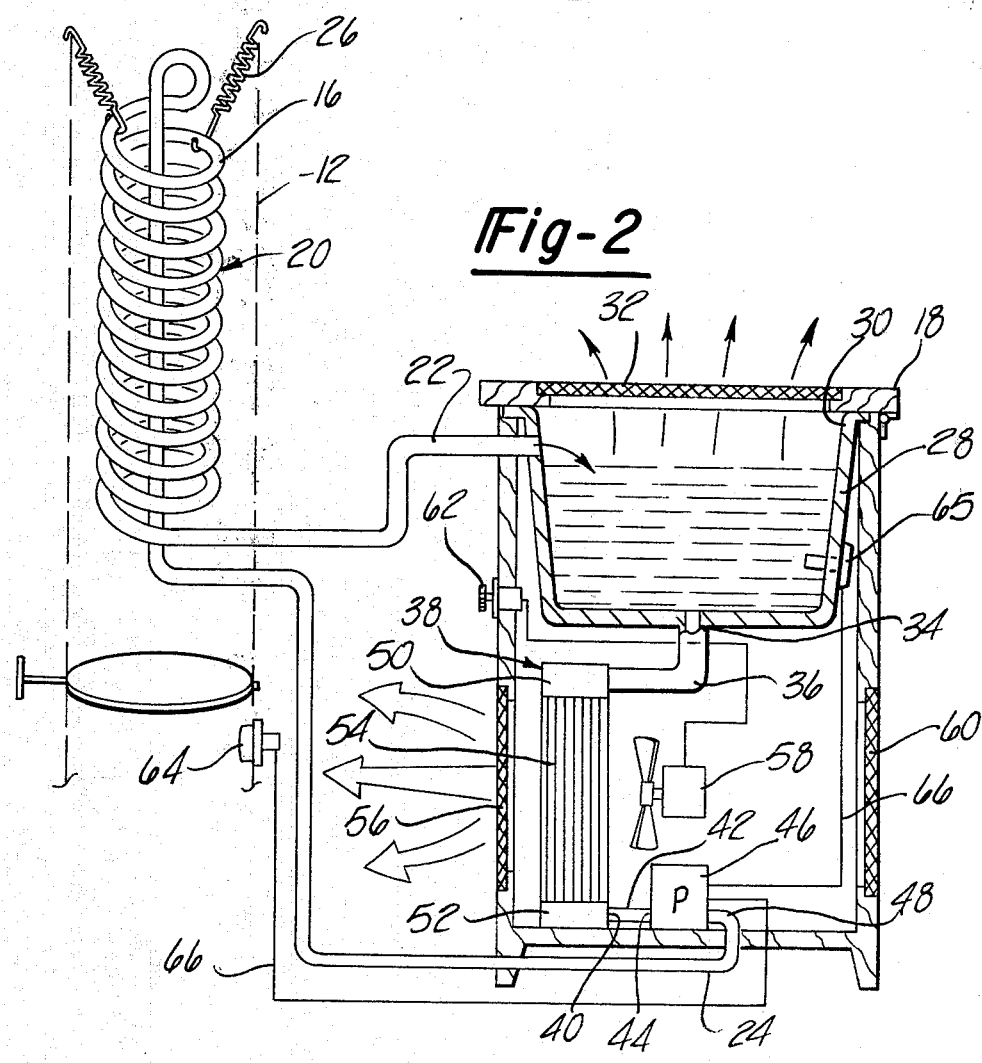
FIG. 2 is a sectional and partial diagrammatic view illustrating the heating system of the present invention.

With reference now particularly to FIG. 2, a holding tank 28 is contained within the interior of the housing 18 near its upper end and is open at its top 30. The open top 30 of the holding tank 28, in turn, is open to the room surrounding the housing 18 through a screen 32 positioned across the top of the housing 18. The purpose of the screen 32 and the open top 30 of the holding tank 28 will be subsequently described in greater detail.

The outlet end 22 from the fluid conduit 20 is open to the interior of the holding tank 28 near its upper end and so that fluid flow through the conduit 22 will flow into the holding tank 28. The holding tank 28 also includes a drain 34 at its lower end which is fluidly connected by a tube 36 to the inlet of a heat exchanger means 38. The heat exchanger means 38, in turn, has an outlet 40 which is fluidy connected by a tube 42 to the inlet 44 of a fluid pump 46 while the oulet 48 from the fluid pump 46 is connected to the inlet end 24 of the fluid conduit 20. Thus, upon activation of the pump 46, a fluid, preferably water, is pumped through the heat collector 16 into the holding tank 28, through the heat exchanger 38 and thereafter returned by the pump 46 to the heat collector 16.

The heat exchanger means 38 can be of any conventional construction and typically comprises an inlet tank 50 and outlet tank 52 and a plurality of thin tubes extending between the tanks 50 and 52. Moreover, as is best shown in FIG. 2, one side of the heat exchanger means 38 is positioned adjacent a screen 56 on the housing 18.

An electric fan 58 is also contained within the housing 18 adjacent the heat exchanger means 38 but on the side of the heat exchanger means 38 opposite from the screen 56. Thus, upon activation of the fan 58, the fan 58 forces air through the heat exchanger means 38 and into the room surrounding the housing 18 through the screen 56. The fan 58, itself, receives inlet air from the room around the housing 18 through a further screen 60 in the housing 18.

The electric fan 58 preferably includes a variable speed motor and the speed of the motor can be controlled by a rheostat 62 which is mounted to the housing 18. The function of the rheostat 62 will be subsequently described in greater detail.

A first heat or temperature sensor 64, is mounted to the fireplace flue 12 and thus senses the temperature within the interior of the flue 12 while s second heat or temperature sensor 65 senses the temperature of the fluid in the holding tank 28. The temperature sensors 64 and 65, in turn, controls the activation of the pump 46 via control lines 66 so that the pump 46 is first activated when the flue temperature exceeds a predetermined temperature. Thereafter, when the flue temperature falls below a predetermined value, indicative that there is combustion in the fireplace 10, the control of the pump 46 posses to the second heat sensor 65. When the fluid temperature in the holding tank 28 falls below a predetermined value, the second heat sensor 65 deactivates the pump 46.

The component parts of the heating system of the present invention having been described, its operation is as follows: Assuming that a fire is present within the fireplace 10, the combustion products from the fire exhaust up through the flue 12 and, upon doing so, heat the heat collector 16. The heat collector 16 is preferably constructed of a high heat conductive material, such as copper, and thus transfers this heat to the water within the heat collector 16. Simultaneously, the temperature sensor 64 senses the high temperature within the flue 12 and thus activates the pump 46.

The pump 46 pumps water through the heat collector 16 so that relatively hot water is pumped through the outlet end 22 of the fluid conduit 20 and into the holding tank 28. At the same time, the relatively hot water from the holding tank 28 flows through the drain 34 and the heat exchanger means 38 and to the pump 46. Simultaneously, the fan 58 is activated which forces air through the heat exchanger means 38 and exteriorly of the housing thus heating the room in the desired fashion. The water flowing from the heat exchanger means 38 and to the pump 46, now relatively cool, is recirculated by the pump 46 to the heat collector 16 for recirculation and this process is continuously repeated.

The adjustability of the fan speed by the rheostat 62 is utilized to vary the amount of heating which is provided to the room. For example, the relatively high fan speed provides greater heating to the room than a lower fan speed.

The temperature sensors 64 and 65 are utilized to deactivate the pump 46 when the flue temperature falls below a predetermined temperature indicative that no combustion is occuring in the fireplace 12 and also when the holding tank temperature falls below a secon predetermined value. Without combustion in the fireplace 12 and after the water has cooled, circulation of water through the heat collector 16 serves no purpose so that deactivation of the pump 46 serves to conserve energy by eliminating the power needed to drive the pump 46.

A primary advantage of the heating system of the present invention, is that the holding tank 28 has an open top 30 which is open to the room through the screen 32. Since the water entering the holding tank 28 from the heat collector outlet 22 is very hot, a certain amount of steam escapes from the top of the holding tank 28 through the screen 32 and into the room thus automatically providing humidification to the room. The humidification of the room attained from the heating system of the present invention is sufficient in practice to completely eliminate the need for auxiliary humidifiers.

From the foregoing it can be seen that the heating system of the present invention is advantageous in that it utilizes the waste heat normally exhaused through the fireplace flue as the heating source for a forced air heating system. Moreover, although the drawing illustrates the housing 18 as positioned adjacent the fireplace 10, it will be understood that the housing 18 can be positioned within other rooms outside the room where the fireplace 10 is contained. In the event that the housing 18 is spaced from the fireplace 10 at a relatively great distance, it is advisable to use insulating material around the portion of the conduit 20 extending between the fireplace flue 12 and the housing 18 in order to prevent heat loss.

Having described my invention, however, many modifications thereto will become apparent to those skilled in the art to which it pertains without deviation from the spirit of the invention as defined by the scope of the appended claims.

I claim:

1. For use in conjunction with a fireplace means having a flue, a heating system comprising:
   a heat collector comprising fluid conduit means having an inlet and an outlet and means for mounting a portion of said fluid conduit means in the flue;
   a housing;
   a tank having an inlet and an outlet, said tank being positioned in said housing, said conduit outlet being connected to said tank inlet;
   heat exchanger means having an inlet and an outlet, said heat exchanger means outlet being connected to said conduit means inlet;
   means for fluidly connecting said tank outlet to said heat exchanger means inlet;
   means for pumping a fluid through said conduit means;
   fan means for moving air through said heat exchanger means and exteriorly of said housing;
   said tank having an open top; and
   said housing including means for establishing substantially unrestricted fluid communication between the open top of the tank and exteriorly of the housing.

2. The invention as defined in claim 1 wherein said heat exchanger means, said pumping means and said fan means are contained within said housing.

3. The invention as defined in claim 1 and further comprising means for sensing the temperature of the interior of the flue and means responsive to said sensing means for activating said pump means when the temperature in the flue exceeds a predetermined temperature.

4. The invention as defined in claim 3 wherein said temperature sensing means comprises a thermocouple.

5. The invention as defined in claim 3 and further comprising means for sensing the temperature of fluid in the tank and means responsive to said last mentioned temperature sensing means for activating said pump means when the holding tank temperature exceeds a predetermined value.

6. The invention as defined in claim 1 wherein said tank outlet is positioned adjacent the lower end of the tank.

7. The invention as defined in claim 1 and further comprising means for controlling the speed of said fan means.

8. The invention as defined in claim 1 wherein said fluid conduit means is coiled in a helix in said flue.

* * * * *

UNITED STATES PATENT AND TRADEMARK OFFICE
CERTIFICATE OF CORRECTION

PATENT NO. : 4,336,905
DATED : June 29, 1982
INVENTOR(S) : James C. Langs

It is certified that error appears in the above—identified patent and that said Letters Patent is hereby corrected as shown below:

Abstract--

Line 13, delete "fluid conductor" and insert --fluid conduit--.

Specification--

Col. 1, line 55, insert "conduit" after "fluid".

Col. 3, line 21, delete "fluidy" and insert --fluidly--.

Col. 3, line 52, delete "s" and insert --a--.

Col. 3, line 61, delete "posses" and insert --passes--.

Col. 4, line 28, delete "indicative" an insert --indictive--.

Col. 4, line 30, delete "secon" and insert --second--.

Col. 5, line 17, after "means;" insert --and--.

Signed and Sealed this

Twenty-first Day of September 1982

[SEAL]

Attest:

Attesting Officer

GERALD J. MOSSINGHOFF

Commissioner of Patents and Trademarks